United States Patent [19]
Fukada

[11] Patent Number: 6,065,465
[45] Date of Patent: *May 23, 2000

[54] PORTABLE COOKING GAS STOVE

[75] Inventor: Satoshi Fukada, Hiyougo-Ken, Japan

[73] Assignee: Fukadack Co. Ltd, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,099

[22] Filed: Jul. 9, 1997

[30] Foreign Application Priority Data

Nov. 18, 1996 [JP] Japan ................................. 8-344421

[51] Int. Cl.⁷ ........................................................ F24C 5/20
[52] U.S. Cl. ...................... 126/38; 126/39 J; 126/39 N; 431/328; 431/344
[58] Field of Search ..................... 126/41 R, 38, 126/39 E, 40, 44, 45, 39 G, 39 R, 414, 39 N; 431/326–329, 266, 208, 344, 207

[56] References Cited

U.S. PATENT DOCUMENTS

| | | | |
|---|---|---|---|
| 1,450,870 | 4/1923 | Sanders | 126/38 |
| 2,498,682 | 2/1950 | Howard | 126/38 |
| 2,928,386 | 3/1960 | Keyt et al. | 126/38 |
| 3,139,879 | 7/1964 | Bauer et al. | 126/38 |
| 3,199,573 | 8/1965 | Flynn | 431/329 |
| 3,853,126 | 9/1958 | Corlet | 126/38 |
| 3,876,364 | 4/1975 | Hefling | 126/38 |
| 4,588,373 | 5/1986 | Tonon et al. | 126/328 |
| 4,726,350 | 2/1988 | Steinhauser | 126/38 |
| 4,896,652 | 1/1990 | Geiter | 126/41 R |
| 5,111,803 | 5/1992 | Barker | 126/41 R |

FOREIGN PATENT DOCUMENTS

| | | |
|---|---|---|
| 51-46265 | 4/1970 | Japan . |
| 53-39668 | 4/1978 | Japan . |
| 8-233275 | 9/1996 | Japan . |

*Primary Examiner*—James C. Yeung

[57] ABSTRACT

A light-weight portable cooking gas stove which is used for cooking at a picnic, hiking, camping, climbing, etc., comprises a hollow circular plate, a circular pipe gas cylinder, a piezo ignition means, a ceramic circular crater substantially centrally disposed with respect to the plate, and an upper cover. The circular gas cylinder is installed adjacent an inner circumference on the bottom of the hollow circular plate to ensure physical stability of the stove. The circular pipe gas cylinder includes on its exterior a gas fuel injection entrance. The ceramic circular crater has a great number of fine through holes to enhance heat efficiency by emission of infra-red rays when ignited. The gas injection entrance and all control means for cooking is operable from the exterior of the hollow circular plate.

17 Claims, 2 Drawing Sheets

PORTABLE COOKING GAS STOVE

BACKGROUND OF THE INVENTION

This invention relates to a light-weight portable cooking gas stove having a circular pipe gas cylinder and more particularly to such a portable ceramic cooking gas stove which can be operated from a cassette gas cylinder. Heat efficiency is improved because of infra-red rays emitted from a heated ceramic crater in the stove.

Recently, the popularity of outdoor sports, hiking, picnic, camping, climbing, etc., has markedly increased due to an increase of social spare time and spare money, and a large number of portable equipment for those sports and outings have also been proposed accordingly.

In such equipment, a portable cooking gas stove has been materially improved and a cassette gas cylinder is currently used in a majority of the Japanese market. However, the known portable cooking gas stove is physically unstable, due to the gas tank being connected on the outside and during cooking may have a tendency to over-turn. Heating power per square centimeter of the known portable cooking gas stove is also weak due to the source of a direct gas releasing system.

A honey-comb ceramic base cooking stove has been proposed in U.S. Pat. No. 4,896,652 and U.S. Pat. No. 5,111,803. The stove disclosed in the above US patents provides a ceramic base which improves the heating efficiency. The ceramic base is inadequate for the compact portable cooking gas stove as in the present invention because a rather large gas cylinder still must be exteriorly separately provided.

BRIEF SUMMARY OF THE INVENTION

A light-weight portable cooking gas stove comprises a hollowed circular plate providing with legs, which forms a main body of the stove. A circular pipe gas cylinder is provided on an inner circumference of the hollowed circular plate. A gas combustion means, installed centrally in the hollowed circular plate, provides, respectively, a circular fine porous ceramic crater thereon and a gas introducing pipe thereunder which is connected with a gas releasing valve on an end of the circular pipe gas cylinder. An ignition plug adjacent the porous ceramic crater is electrically connected with a piezo ignition switch projecting from an outside wall of the hollowed circular plate to ignite the gas released from the ceramic porous crater.

The circular pipe gas cylinder is provided with a gas injection entrance on one end to fill up the gas from an outside of the hollowed circular plate by a cassette gas cylinder. The gas releasing valve on another end is provided with a gas discharge control lever and a gas discharge lever projecting from the outside wall of the hollowed circular plate, respectively.

The ceramic crater is formed in a shape of a circular plate having a great number of fine holes to increase heat efficiency by infra-red rays emitted during combustion. The light-weight portable cooking gas stove is finally covered with an upper cover like a trivet.

Accordingly, it is an object of the present invention to provide a light-weight portable cooking gas stove which is very stable when in use for cooking.

It is another object of the present invention to provide a light-weight cooking gas stove which is able to supply gas into a circular pipe gas cylinder from outside of a hollowed circular plate by a cassette gas cylinder.

It is a further object of the present invention to provide a light-weight portable cooking gas stove which has remarkably improved cooking efficiency because of a central circular ceramic crater.

It is still another object of the present invention to provide a light-weight portable cooking gas stove which is able to ignite gas and to control gas supply from outside of a hollowed circular plate.

It is still further object of the present invention to provide a light-weight portable cooking gas stove which has a wide space inside a hollowed circular plate to make air circulation more easily for a ceramic crater from a bottom of the stove.

It is still another object of the present invention to provide a light-weight portable cooking gas stove which installs a support for gas and air supply means to a circular ceramic crater.

It is furthermore another object of the present invention to provide a light-weight portable cooking gas stove on which sets an upper cover-like trivet on which is safe to place a cooker.

BRIEF DESCRIPTION OF THE SEVERAL VIEWS

DETAILED DESCRIPTION OF THE INVENTION

Figure 1:
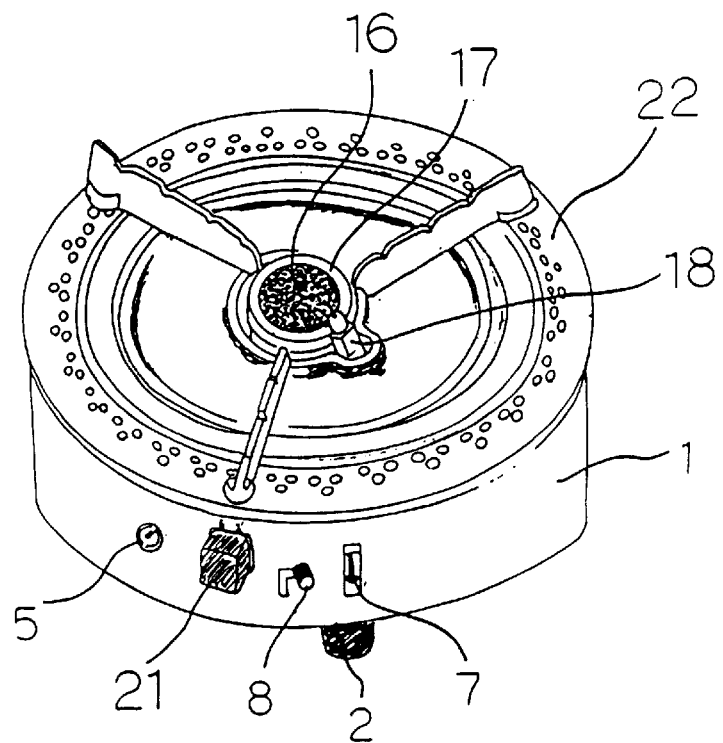
FIG. 1 is a perspective view of one embodiment of a light-weight portable cooking gas stove.
Figure 2:
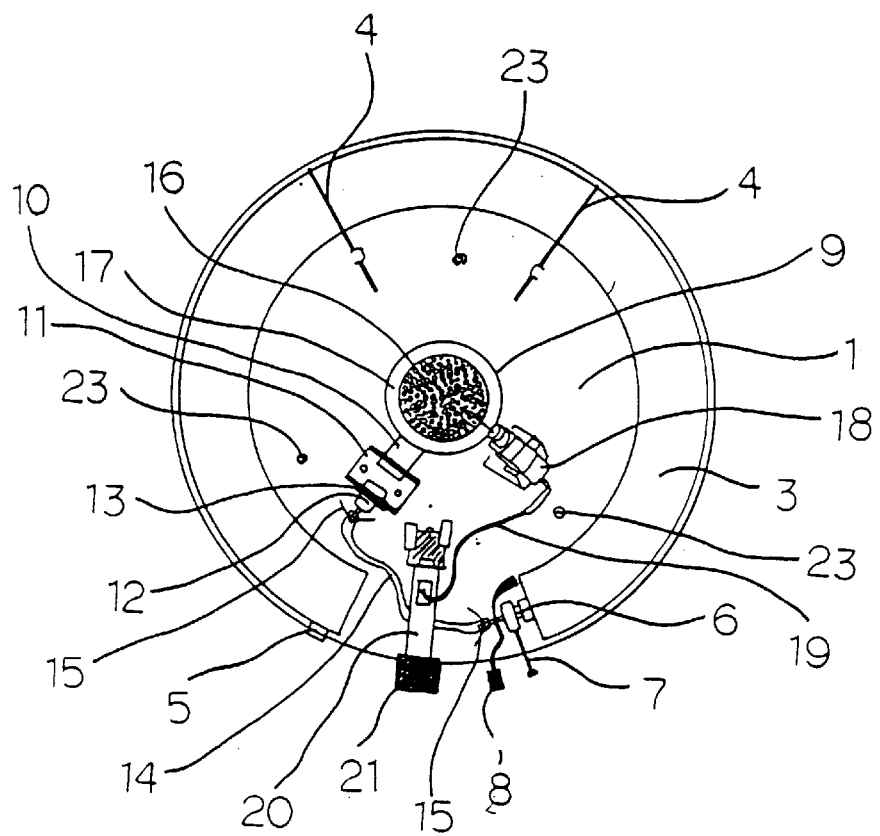
FIG. 2 is a plan view of the light-weight portable cooking gas stove shown in FIG. 1.
Figure 3:
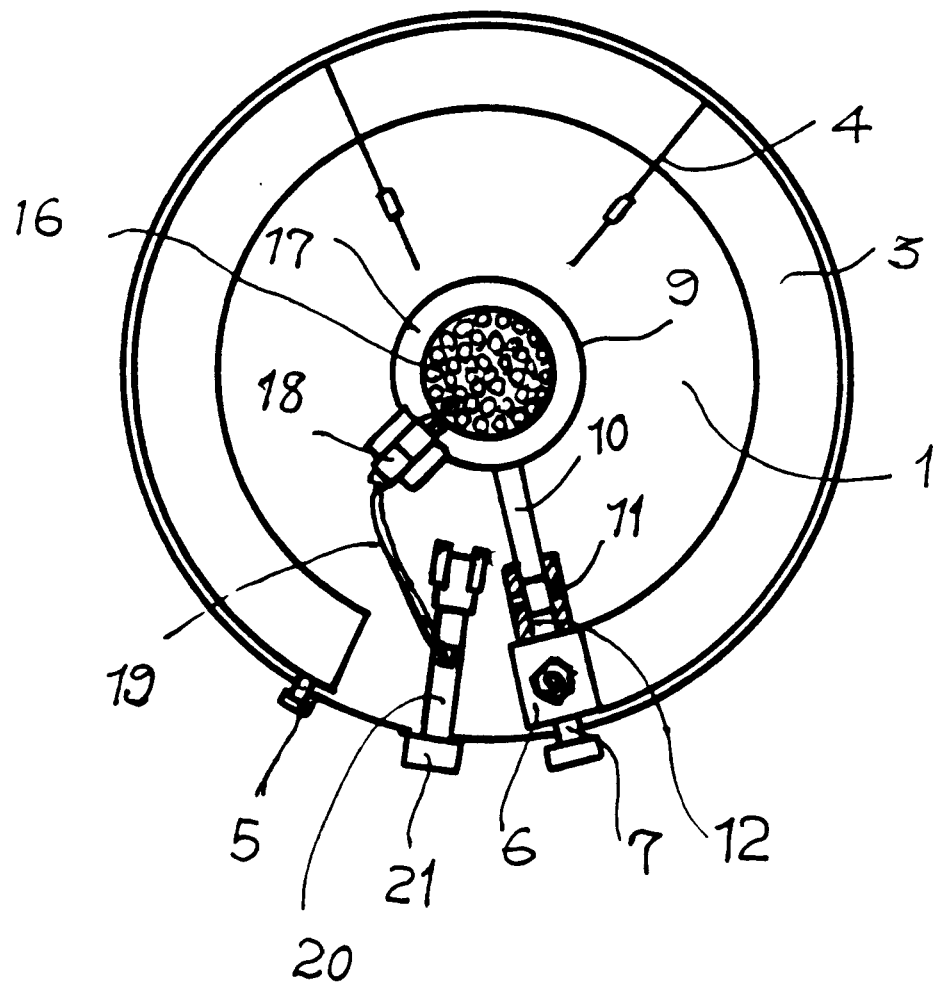
FIG. 3 is a plan view of another embodiment of a light-weight portable cooking gas stove.

FIGS. 1 to 3 show an embodiment in which a hollowed circular plate 1 forms a ceramic portable gas stove body comprising a circular hollow housing having a circular bottom plate and an interconnecting circular side plate. The plate has three rubber legs 2 attached on a bottom outer surface by screws 23. A circular pipe gas cylinder 3 is fixed by fastening pins 4 alongside a bottom marginal inner surface of the plate. The circular pipe gas cylinder 3 is a circularly incomplete pipe having space ends.

An injecting entrance 5 of pressurized gas fuel for the circular pipe gas cylinder 3 is attached on an end of the later, through a side wall of the hollowed circular plate 1, so that it projects to the outside of the side wall.

A gas discharge valve 6 is on another end of the circular pipe gas cylinder 3 and a gas discharge control lever 7 is combined therewith so that it projects outwardly through the side wall, to provide for a vertical operated discharge control along a vertical slit in the side wall of the hollowed circular plate 1.

A gas discharge lever 8 is connected with the gas discharge valve 6 and the gas discharge control lever 7 and projects outwardly, as the control lever 7, through a right angular slit on the side wall.

Inside the plate 1 a gas combustion pipe 9 is installed centrally in the hollowed circular plate and thereunder, a gas introducing pipe 10.

A support 11 for the gas introducing pipe 10, having a hole on each side wall, is formed as a right angular conduit. The support is attached on a bottom inner surface of the hollowed circular plate 1, and one of the holes supports the gas introducing pipe 10 therein and the other hole supports a gas releasing nozzle 12 by insertion of the later into the former.

The inserted end of the gas releasing nozzle 12 is firmly connected by a circular pin 13 into the hole. In the embodiment of FIGS. 1 and 2, the other end of the nozzle is inserted into an end of vinyl pipe 14 to connect the gas discharge valve 6 with the vinyl pipe. Both inserted ends of the vinyl pipe 14 is respectively fastened firmly by wire pins 15.

A ceramic circular crater 16 which has many exceedingly fine through holes, is inserted into an upper portion of the gas combustion pipe 9 and is set firmly by putting a clasping ring 17 thereon.

A piezo ignition plug 18 is arranged adjacent to the ceramic circular crater 1. A lead-in wire 19, connected to the lower portion of the plug 18, connects with a piezo ignition switch lever 20 attached between the pressurized gas injecting entrance 5 and the gas discharge lever 8.

A push-button 21 is inserted firmly into the piezo ignition switch lever 20 and projects outwardly from the hollowed circular plate 1, the same as the pressurized gas injecting entrance 5, the gas discharge lever 8 and the gas discharge control lever 7, so that they are able to operate respectively from the outside of the hollowed circular plate 1.

The assembled gas cooking stove has an upper cover 22 like a trivet.

FIG. 3 shows another embodiment having no vinyl pipe 14 between a gas releasing nozzle 12 and gas discharge valve 6. A gas introducing pipe 10 connects a ceramic circular crater 16 with a gas releasing nozzle 12 through a support 11. The gas releasing nozzle 12 is directly installed on a gas discharge valve means 6 on one end of a circular pipe gas cylinder 3.

A gas discharge control lever 7, combined with the gas discharge valve 6, projects outwardly through a side wall of the hollowed circular plate 1 for control of the gas discharge from outside of the plate 1.

The circular pipe gas cylinder 3 in all of the embodiments may be covered on an inner surface with a sponge layer, such as a foamed rubber, a foamed plastic and the like, to promote evaporation of the pressurized gas fuel and to eliminate contaminating dust in the gas fuel. The inner sponge layer improves combustion efficiency of the ceramic circular crater 16.

In cooking on the portable cooking gas stove 1, firstly, the circular pipe gas cylinder 3 is charged with the gas fuel from a cassette gas cylinder (not shown) connected with the cylinder 3 through the injecting entrance 5. A suitable cooker, such as a rice cooker, is placed on a cooking rack of the upper cover 22 prior to ignition of the gas fuel. The gas discharge valve 6 is opened to release the gas fuel to the circular pipe cylinder 3 by operating the gas discharge lever 8.

The released gas flow is controlled by the gas discharge control lever 7 to supply the flow properly to the ceramic circular crater 16. The gas flow through the crater 16 is ignited by the ignition plug 18, which is operated by pushing the button 21 of the ignition switch lever 20 projected outside of the hollowed circular plate 1.

Combustion heating for the ceramic cooking stove is controlled by the gas discharge control lever 7 so that combustion of the gas fuel is attained in a short period. The infra-red rays, which can enhance heating efficiency, is emitted from the ceramic circular crater 16 by maintaining itself at a higher temperature.

During cooking, the emission of infra-red rays by the ceramic crater 16 is very effective because the crater is provided with a great number of fine through holes which allows the gas to blow up efficiently therethrough to reach perfect combustion in a short period.

During cooking, the stove is stabilized because the circular pipe gas cylinder 3 is installed alongside the inner circumference of a bottom of the hollowed circular plate 1. This prevents over-turn because the center of gravity would be raised when a load, such as a large rice cooker, etc., is place on the stove.

A large central space surrounded by the circular pipe cylinder 3 permits air for the gas combustion to easily pass through the space to the crater 16 and does not inhibit the heat therebetween. Consequently, the cooking stove body is not heated.

The circular pipe gas cylinder 3 is supplied gas normally from a cassette gas cylinder (not shown) and sold on the market for portable cooking gas stove. The gas fuel is supplied through the gas injection entrance 5 and is easily controlled by the piezo ignition switch lever 20, the gas discharge control lever 7 and the gas discharge lever 8, which project outside of the hollowed circular plate 1, respectively.

While there has been described and pointed out the fundamental novel features of the invention as applied to preferred embodiments, it will be understood that various omissions and substitutions and changes in the form and details of the cooking gas stove illustrated and its operation may be made by those skilled in the art, without departing from the spirit of the invention. The invention, therefore, is limited only as indicated by the scope of the following claims.

I claim:

1. A cooking stove to be connected to a source of pressurized gas fuel comprising:
   a circular hollow housing having a circular bottom plate and an interconnecting side plate;
   a circularly incomplete pipe cylinder disposed within the housing and circumferentially adjacent an inner circumference surface of the side plate, the circular pipe having spaced ends;
   a gas inlet connection for the pressurized gas fuel accessible exteriorly of the housing, the inlet being connected to the pipe cylinder;
   a ceramic crater disposed concentrically with the pipe cylinder and upstanding from the bottom plate;
   a gas valve having a control extending through the side plate;
   a pipe connecting the pipe cylinder to the ceramic crater;
   a piezoelectric igniter having an ignition control extending through the side plate; and
   a circular upper cover for closing the housing, the cover having a central opening for the upstanding crater, the cover having an upper surface forming a trivet.

2. The stove of claim 1 wherein the ceramic crater is circular and is provided with a great number of fine through holes to emit, when heated, infra-red rays to enhance heat efficiency.

3. The stove of claim 1 wherein the ceramic crater and the circular pipe cylinder are interconnected by a support, the support having holes for an air entrance and a gas introducing pipe.

4. The stove of claim 1 wherein the ceramic crater and the circular pipe cylinder are interconnected by a support, the support having holes for an air entrance, a gas introducing pipe having a gas releasing nozzle.

5. The stove of claim 1 wherein the circular pipe gas cylinder is covered on an inner surface with a sponge layer such as foam rubber or foam plastic.

6. The stove of claim 1 wherein the circular gas cylinder surrounds a large central space to allow easy passage of air to assist in the combustion of the gas fuel at the crater.

7. The stove of claim 1 wherein the pipe connecting the pipe cylinder to the ceramic crater is flexible.

8. The stove of claim 1 wherein the pipe connecting the pipe cylinder to the ceramic crater is a vinyl pipe.

9. The stove of claim 1 wherein the pipe connecting the pipe cylinder to the ceramic crater is through the gas valve.

10. The stove of claim 1 wherein the gas valve is connected to one end of the circularly incomplete pipe cylinder.

11. The stove of claim 10 wherein the pipe connecting the pipe cylinder to the crater is a flexible pipe having one end connected to the gas valve.

12. The stove of claim 11 wherein another end of the flexible pipe is connected to a support adjacent to the ceramic crater.

13. The stove of claim 1 wherein the gas valve control and the ignition control are disposed in the space between ends of the circularly incomplete pipe cylinder.

14. The stove of claim 1 wherein the cover has air passage openings.

15. The stove of claim 1 wherein a gas discharge valve lever is connected to the gas valve, the lever extending through the side plate.

16. The stove of claim 15 wherein the gas discharge lever is disposed in the space between the ends of the circularly incomplete pipe cylinder.

17. The stove of claim 1 wherein the gas inlet connection extends through the side plate.

* * * * *